United States Patent
Gits et al.

(10) Patent No.: US 6,775,833 B1
(45) Date of Patent: Aug. 10, 2004

(54) METHOD OF MANAGING A SCALABLE INTERFACE COMMUNICATION SYSTEM

(75) Inventors: Peter Michael Gits, Agoura Hills, CA (US); Dale J. Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 09/697,821

(22) Filed: Oct. 26, 2000

Related U.S. Application Data

(60) Provisional application No. 60/223,824, filed on Aug. 8, 2000.

(51) Int. Cl.$^7$ ............................. G06F 3/00; G06F 9/44; G06F 9/46; G06F 13/00
(52) U.S. Cl. ...................................... 719/310; 709/223
(58) Field of Search ............................... 709/310–320; 719/310–320

(56) References Cited

U.S. PATENT DOCUMENTS

| | | | |
|---|---|---|---|
| 5,884,324 A | 3/1999 | Cheng et al. | |
| 6,061,740 A | 5/2000 | Ferguson et al. | |
| 6,412,017 B1 | 6/2002 | Straube et al. | |

OTHER PUBLICATIONS

Benedicto, Regions: A Scalable Infrastructure for Scoped Service Location in Ubiquitous Computing, May 1999, Massachusetts Institute of Technology 1999, pp. 2–109.*
Arnold, The Jini Architecture: Dynamic Services in a Flexible Network, ACM, Jun. 1999.*
Aschemann et al, A Framework for the Integration of Legacy Devices into a Jini Management Federation, Springer–Verlag, Oct. 1999.*

* cited by examiner

Primary Examiner—Meng-Al T. An
Assistant Examiner—Diem Cao
(74) Attorney, Agent, or Firm—Marger Johnson & McCollom, P.C.

(57) ABSTRACT

A method for managing a scalable infrastructure communication system. The method includes initializing the communication system with at least one space having at least one lookup service, activating a Community Service application, and using the Community Service application to manage the communication system. Managing the system includes the tasks of registering, adding and deleting entities within the communication system. The entities are services, agents, Spaces and Communities. As the system operates the Community Service application updates the Community Service application responsive to registrations, additions and deletions in the communication system, and continues to manage and update the system.

8 Claims, 3 Drawing Sheets

METHOD OF MANAGING A SCALABLE INTERFACE COMMUNICATION SYSTEM

RELATED APPLICATIONS

This application is a continuation of, and claims priority to, U.S. Provisional Patent Application No. 60/223,824, filed Aug. 8, 2000.

| Ser. No. | Title | Filed |
|---|---|---|
| 09/695,750 | Fully Distributed, Scalable Infrastructure, Communication System | Sep. 29, 2000 |
| 09/698,779 | Smart Secretary | Oct. 27, 2000 |
| 09/711,378 | Replication of a Scalable Infrastructure System | Nov. 9, 2000 |
| 09/695,750 | Object Agents in a Scalable Infrastructure System | Oct. 24, 2000 |
| 09/746,798 | Address Services in a Scalable Infrastructure Communication System | Dec. 20, 2000 |
| 09/694,740 | Interconnective Agents in a Scalable Infrastructure System | Oct. 23, 2000 |
| 09/697,821 | Conference Calling in a Scalable Infrastructure System | Nov. 14, 2000 |
| 09/882,221 | Net Lurkers | Jun. 15, 2001 |

BACKGROUND

1. Field

This disclosure relates to distributed communication systems, more particularly to a distributed application system using persistent stores and agents with a registration and lookup service.

2. Background

Sun Corporation developed Java™, a three-part distributed means for computing. The three parts of Java™ are the Java™ programming language, the Java Virtual Machine™ (JVM) and the Java™ platform.

The Java™ programming language is just that, a programming language with its own syntax, structures and procedures similar to all other languages. It is the language in which Java™ applications such as applets, servlets, and JavaBeans™ components are written. A unique part of the Java™ language, however, is that it does not compile into machine-readable code, as most other languages do. It compiles into byte codes. These byte codes are interpretable by the JVM.

The JVM is the Java™ interpreter. Java™ programs are portable, being in byte code format, but they are only portable to platforms to which a Java™ interpreter has been ported. Fortunately, JVMs are freely available for virtually all types of systems, from desktop systems running Windows, Unix or Macintosh, to cell phones. All of these are capable of being a Java™ platform.

A platform typically identifies a set of application programming interfaces (APIs) typically defined by the operating system. A programmer writing a program to run on a specific operating system such as Windows would use a different set of APIs than a programmer writing a program for the Macintosh operating system. However, the Java™ platform provides APIs that run on any operating system running the Java™ platform. In some respects, the Java™ platform is an intermediate platform between the Java™ code and the operating system. It allows programmer to write a program once and run it anywhere.

Because Java™ code may run on several different operating systems and several different devices, it would seem a logical extension of this would be to connect these all together. Jini serves as the framework to make those connections. Jini is a set of specifications that allows different services to discover each other on a network. The specifications also allow these services to participate in operations on this network; the network is sometimes referred to as a community. However, to avoid confusion in further discussions the network will be referred to as a network or a Jini community.

Jini focuses on services. A service may also be thought of as a service interface. For example, a certain device such as a server may present an interface to the outside world that is the device API. This API interface is a service. Because Jini is a distributed framework, there will be clients and servers. However, these clients and servers only care about the interfaces that allow them access to the other clients and servers. The client or server will know about the particular service API, but does not care about the implementation. For example, there may be a printer on the network. Another member of the network will know that there is a printer API but does not care what kind of printer it is. The print service will allow the member to send a print job to the service and will handle the translation of the print job to the specific API for the printer.

One example of a Jini service is JavaSpaces™. Simply, JavaSpaces™ define a persistent store. In terms of the above discussion, a client that wants to use JavaSpaces™ only needs to know the JavaSpaceS™ API. The client does not need to know the specifics on what type of server upon which the JavaSpaces™ is implemented.

From the above discussion, it would seem that the combination of Java™, Jini and JavaSpaces™ would provide an incredibly powerful, flexible means for establishing, running and reconfiguring networks. However, there are some limitations. For example, in order for Jini to function, as well as the JavaSpaces™, the Java™ language must exist in every device on the network whether client or server. Other minor weaknesses also exist, such as the required presence of a network, and the required presence of the devices that run JVM. Calls to a device that is temporarily unavailable are not allowed. Once a device goes off the network, anything addressed to it is removed as well.

The largest weakness in the current state of the art lies in the requirements of knowledge. Participants in a Jini community must know about each other's interfaces if they are to use each other. While the device sending the print job did not need to know the printer specifics in the above example, it did need to know the specifics of the print API. Service consumers and service providers must agree upon a common interface for the service to be used effectively. This restricts the application of these technologies to a fully distributed application system.

SUMMARY

One aspect of the invention is a method for managing a scalable infrastructure communication system. The method includes initializing the communication system with at least one space having at least one lookup service, activating a Community Service application, and using the Community Service application to manage the communication system. Managing the system includes the tasks of registering, adding and deleting entities within the communication system. The entities are services, agents, Spaces and Communities. As the system operates the Community Service application is updated as entities are registered, added and deleted in the communication system. During operation of the system, the Community Service application continually manages the system and is updated accordingly.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
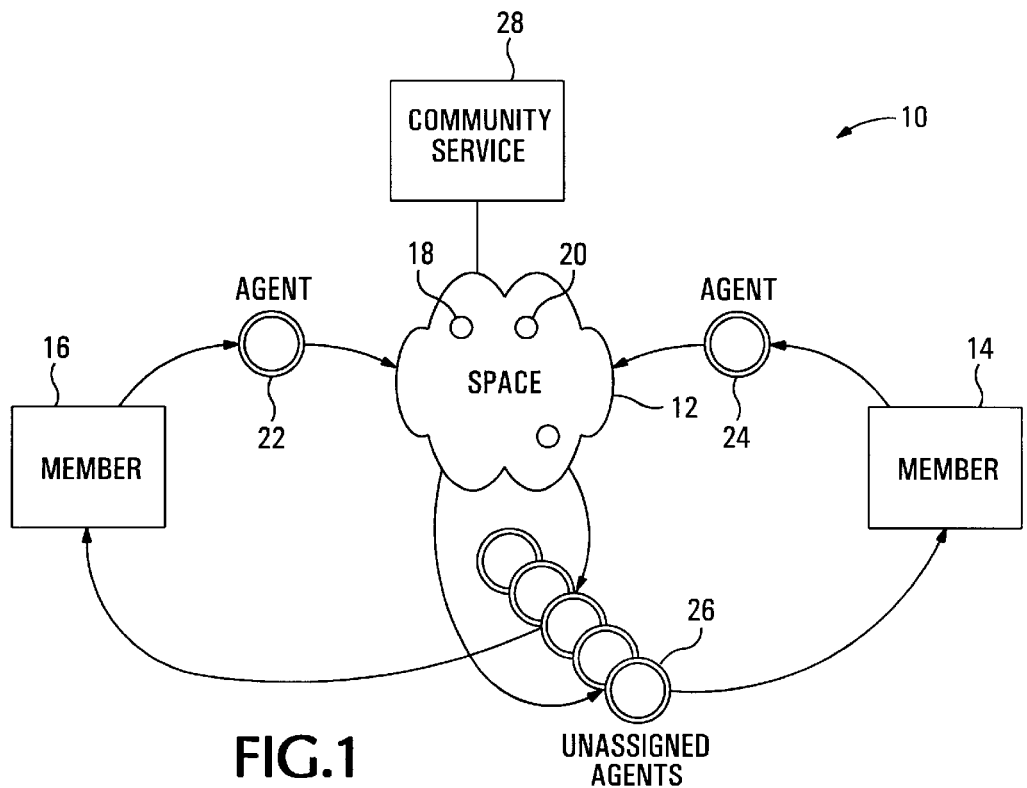
FIG. 1 shows a scalable infrastructure communication system.

Current Jini technology uses the term 'community' or 'federation' to refer to a network. However, the network is not any network; it must be a network running a Jini lookup service with which all the members of the community are registered. The members of the community are services, clients and the lookup service. Services are anything that can interact with other members of the community to provide those members with some capability. Examples include devices, like printers, servers and workstations, and software applications, including user interfaces. The interaction focuses around the interface for each member, and it is actually these interfaces that are the services.

Services register with the Jini lookup service to allow other members of the community to find them. Client members desire to use the services. The clients in the Jini system find the available services by using the lookup service. Clients locate the lookup service by a process called discovery.

Discovery is accomplished through either multicast or unicast. Multicasting involves the client sending out a multicast request of a specified format. All Jini lookup services that receive the request respond to it, allowing the client to 'discover' them. The response takes the form of an object, referred to as a registrar. Unicast is the term used to indicate that the address of the lookup service is known. The client discovers the lookup service by confirming its existence.

Once the lookup service has been discovered, the client can access the registry to determine if the service desired is available. When the service is located, the client receives an object called a proxy that allows the client to run the service. In some ways, it is as if the service is running in two different places at one time. The service runs on whatever member is providing the service and the proxy runs the service on the client member. This allows for a considerable communication distance between the service and the client. In a distributed computing system, the possibility exists that the service and client may have a significant distance between them. It is the lookup service that allows these distant members to locate each other.

The lookup service is itself a service. As a service it would seem to be required to register with itself. Yet, until the lookup service is created, it has no place to register. One solution to this problem is to implement a Jini system using JavaSpaces™, which provides an initial lookup service upon system initialization. This allows the clients and services to have a starting point from which to locate and interact with other members of the system. More lookup services may be created as the system evolves, but these would not be possible without an initial lookup service to coordinate further expansion.

As mentioned above, the current state of registration and lookup limits the extensibility of the Jini community. If a member of the Jini community registers to a group called 'Group 1,' the lookup service assumes that all other services that want to be part of that group should register with 'Group 1.' There is no possibility of extending any of the registrants to operate in other communities or their respective participants.

In one embodiment of the invention, it is possible to deploy a Scalable Infrastructure (SI) fully distributed application system. The SI system uses a combination of a persistent store and agents to provide a communication system extensible to nearly all types of interfaces and any number of users and applications. The SI system defines Communities around the persistent store, or space, with space or non-space oriented interpreters, referred to as double agents.

Double agents act as interpreters between members of the SI Community. A Community as used here will refer to a collection of these agents and a persistent store. Any type of persistent store could be used, with the capabilities of having objects inserted into the store such that they do not lose their attributes and of providing a notification service as the objects are inserted. In this particular example, JavaSpaces™ will be used as the persistent stores, but the SI system is applicable to any similar technology. For ease of discussion, the persistent stores will be referred to as 'Spaces.' Spaces can be used in several different implementations, and the following discussion is meant only as an example.

An individual Community revolves around a Space, usually a local Space. The Space allows decoupling of associations between applications, clients, servers, proxies, etc., and acts as an intermediary. It also allows for typing of objects as well as a notification process for any new objects entered into the Space. Using the Space alleviates the problems with Jini, noted above, when used in combination with the double agents and the Community Service application.

Because of the nature of the Space and the double agents interaction with it, only a limited number of APIs is needed. In one implementation of an SI system, only the following APIs were needed: take, take_if_exists, read, read_if_exists, and notify. In addition to demonstrating the high flexibility of this system, the use of five APIs also keeps the relative sizes of the agents small.

Agents register with the Community Service application as services. They publish their proxies in the lookup service. Alternatively, the Community Service application could act as a lease holder for all the agents, and all agents would have to keep a valid lease with the Community Service application, that way there was a direct link to each agent through the CS. However, it is believed that the publication of proxies with the Community Service application is the more practical approach.

As can be seen in FIG. 1, the Community Service application can manage a simple communication system having one space with only a few members. Community 10 comprises the entire communication system. The Community Service application 28 maintains a registry of the all the entities in the system. In this example, the entities include members 14 and 16, active agents 22 and 24, space 12 and the unassigned agents 26. The Community Service application has a self-healing property of the Community Service application where all the agents and services within a Community are monitored, stopped, re-started, and cloned without requiring administrative intervention.

Generally, the system allows members to communicate with other members. One member 14 generates a data stream according to the native protocol of that member. A double agent 24 interprets that data stream and converts it into the protocol for the Space 12, by creating an object 18 to be entered into or 'dropped' into the Space 12. Other double agents, such as 22, notified of the object's presence because it was registered to be notified, retrieve the object 18 and re-interpret it for the called member 16. One of the aspects of the SI system that allows this type of interaction to take place is the Community Service application and its management of the various entities in the Community.

For example, if member 14 or 16 is to be removed from the Community, the Community Service application would receive an instruction from the system administrator or the member. The message would notify the Community Service application that the member was to be deleted. This prevents the Community Service application from renewing that member's lease, as well as causing the Community Service application to remove that member from the registry. A similar process would occur for agents through the management of their published proxies.

The publication will have a lease based on the amount of time requested from the agent to publish this information and will be required to renew its lease before it expires. By doing this, the Community Service application only needs to gather information on who has failed to renew their lease with the lookup service. The Community Service application registers with the pre-existing lookup service for events. For example, in one embodiment discussed above, the lookup service extends leases to agents and Spaces. The agents and Spaces are responsible for renewing their leases with the lookup service. When one of them fails to renew its lease, the lookup service sends a notification message to the Community Service application notifying it of the failure to renew. This would then trigger the Community Service application to perform some action to fix this process.

When this happens, the CS can either contact an administrator in some way or simply restart the service through another launcher service installed on each box. If the Community Service application has already been notified, for example, that there is no member using that agent in the system any longer, it can allow the lease to lapse. This cuts down on the amount of housekeeping and overhead that the Community Service application is required to keep.

Additionally, leasing allows the Space to avoid clutter from expired or unanswered objects. The double agent may place a lease on the object generated by the phone call that expires after the amount of time it takes for four rings. After that time expires, the lease on the object expires and the object is removed from the Space. The Community Service application manages the leases on objects as well as the leases on the proxies for the agents.

The Community Service application will be able to determine if an agent within a particular Community has stopped by its failure to renew its lease. The Community Service application would then be responsible for launching another copy of that agent. This is also the single point of administrative control across all the Communities. Multiple Community Service applications should be running within the SI framework to provide the Community Service application additional fail-over and redundancy. Its behavior should also provide for persistent storage of the communities.

By maintaining the "wellness" information of agents and services within a Community, the Community Service application also has the ability to launch new clones of these agents and services throughout the different communities based on load metrics. This provides for some dynamic distributed load behavior. For example, if "Group 1" were to be hit with 1000 calls within a minute, the Community Service application could launch another (N) agents anywhere within the Community to handle this increased load. This Service could also leverage additional hardware that is on standby to increase performance during peak loads. Alternatively, it could shut down lightly utilized agents and unused Services when the load decreases.

Members will be added to the Community through the lookup and discovery process, with some added capabilities with regard to adding Spaces, which will be discussed in more detail later. Additionally, the Community Service application can add agents as needed, to balance the load of the system. For example, if a Community is operating as a telephone system and there is a sudden influx of calls, the Community Service application can spawn more agents of the necessary type to handle the increased number of member data streams sending requests to the Space.

Figure 2:
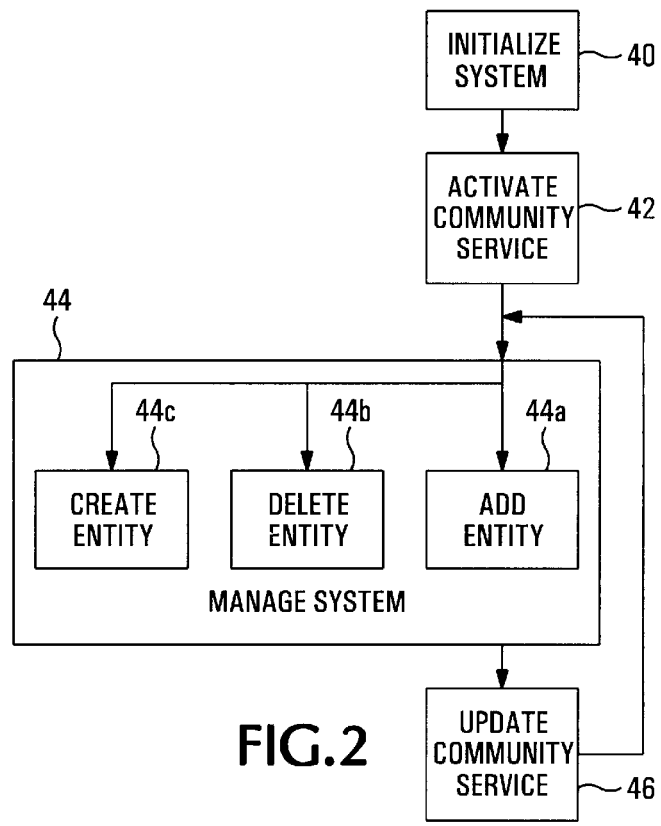
FIG. 2 shows a flowchart of one embodiment of a method to manage a scalable infrastructure communication system.

One embodiment of a method to manage a communication system using a Community Service application is shown in FIG. 2. The system is initialized at 40. At 42, the Community Service application is activated. Typically, this will occur from the execution of a set of software instructions performed once the Space and the initial lookup service are established. These software instructions will reside in a network device with a processor for executing the instructions, and an associated memory to store the instructions. The parts of the Community Service application, such as the registry database or lookup table, may reside on a different network device than the instructions, or may reside in several different network devices.

Once activated, the Community Service application manages the system at 44. This will include tasks such as adding entities at 44*a*, deleting entities at 44*b*, and creating entities at 44*c*. The entities include agents, members and other Spaces, which will be addressed with regard to FIG. 3. As any management tasks are completed, the Community Service application is updated at 46 to reflect the changes in the entities used in the Community. The management and updating process continues for as long as the system is in operation.

Having seen the operation of the Community Service application 28 in a system made up of one Space, it is now useful to discuss further capabilities of the SI system when compared to the typical Jini system. In a Jini system it is not possible to add another space to a community. Using the Virtual Space established by the Community Service application, however, a partially populated or unpopulated space can be joined into the Community.

Currently within the definition of a Jini community defined by Sun, there is a concept of a community and a federation that is limited by the service ability to register with a lookup service, as discussed briefly before. The lookup service acts as a broker and defines a loose set of "group/community" properties. While useful, it falls far short of being able to coordinate multiple spaces into a single "Virtual Space" and doesn't define any characteristics on inter-communication between the Jini communities and their respective entities and agents. The Community Service application is another additional application layer that goes beyond the simple registration to a lookup service within a group.

The ability to tie multiple Spaces together and represent them as a "Virtual Space" within a Community enables the fault tolerance and distributed capabilities of the system. Without the Community Service application, each agent would have to know the intimate details of all of the SI Spaces. Having a "Virtual Space" allows each agent to be notified of a registered event within each Space and provides additional scalability through distributed Spaces. The Spaces could reside on one of any number of network devices, such as in the memory of multiple servers.

The Community Service application acts as a registration board that contains all the JavaSpaces within a single community. These registrations of spaces will be kept through a lease with the lookup service. Each space will have additional attributes added to these spaces, which will help to identify their states within the virtual community. Examples of these attributes include joining, creating registrations, persistent, location, amount of memory that the existing hardware is capable of, etc. These attributes will assist an administrator to bring spaces into the virtual Community and also to remove them from the community. The Community Service application's main responsibility is to keep track of the spaces within a single community.

Without this particular Service, there would be no way to introduce a new unpopulated Space to the rest of the community. When another Space is added to the "Virtual Space", it initially starts up unpopulated and the Community is restricted from using it until it is fully populated. In the SI system, when a new Space is joining the system, it registers with the Community Service application. The Community Service application then loads its registry into the new Space and registers any members of that Space as well as the Space itself. Once the registries are mutually updated, the Space is now online and usable by the rest of the community.

Within the current Jini lookup-and-discovery model, altering the community to which the new space belongs would be required. A more elegant way of introducing a new SI Space to the rest of its community is needed. In the Community Service application model, a new Space can be introduced into the 'Virtual Space' with additional attributes that reflects a staging behavior and partial/full participation within a community.

Additional benefits of a "Virtual Space" are multiple Spaces taking the load for all users; e.g. active/active load balancing architecture between all of the Spaces in the Community, and not an active/standby/fail-over pattern as in most other distributed communication frameworks. The Community Service application can provide administrative tasks such as tracking the Spaces as mentioned above. This will simply be to offload the responsibility of each agent having to discover the spaces within its own community.

Additionally, the Community Service application provides for the ability to partition within a single community both events and agents to enable dynamic load balancing and scalability improvements. For example, all events/agents/SI Spaces could be partitioned or separated for the exchange having 123 and 456 telephone prefixes into separate partitions within a single Community. This provides multiple layers of a hierarchy that can be partitioned based on need and requirements.

Figure 3:
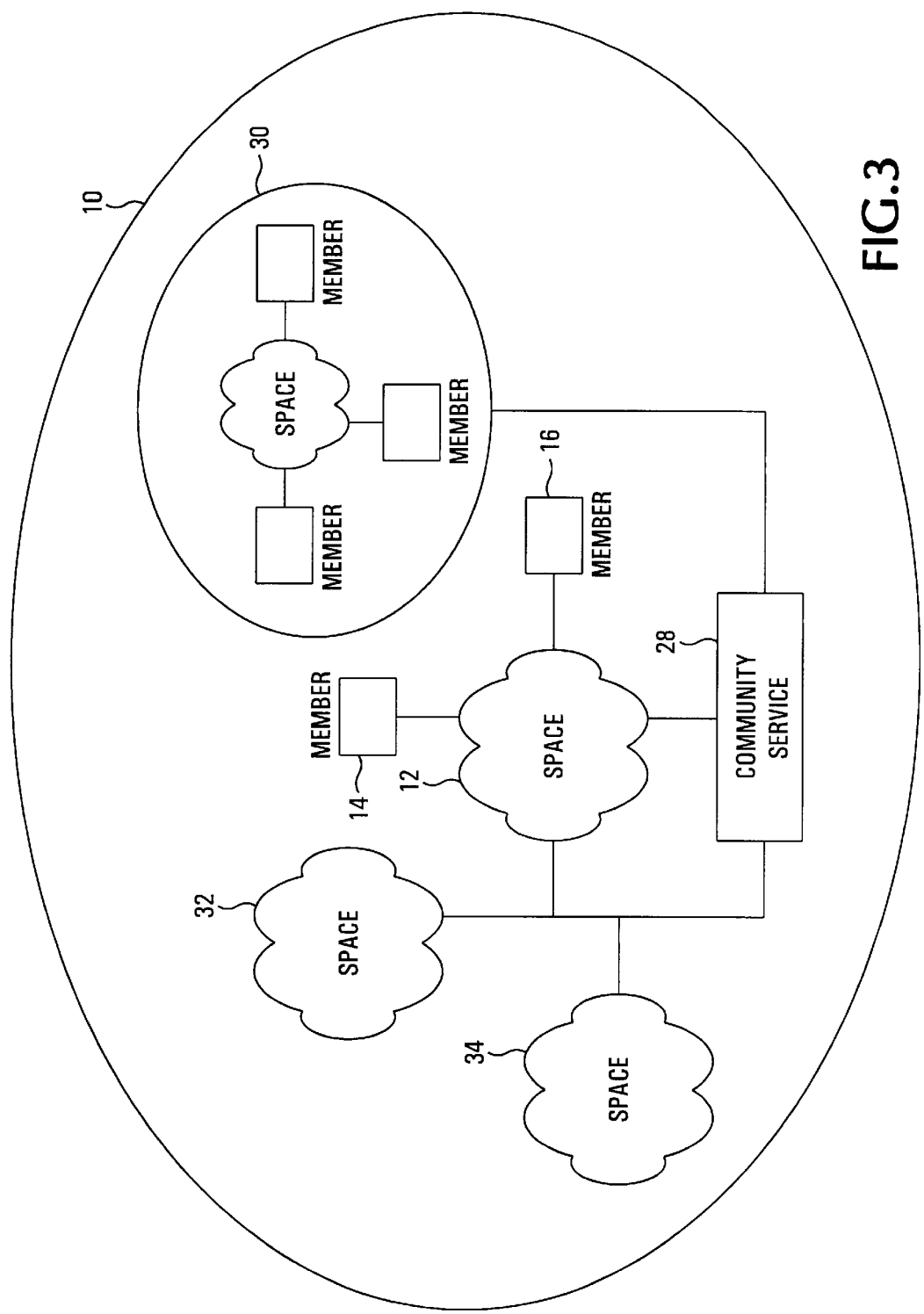
FIG. 3 shows a block diagram of one embodiment of an extended Community in a scalable infrastructure communication system.

FIG. 3 shows on embodiment of the Community 10 from FIG. 1, after considerable expansion. The Community has it original members 14 and 16 using Space 12. The Community Service application 28 can add further members, including unpopulated Spaces 32, 34, as well as populated Space 30.

The new spaces 32 and 34 will be joined by the process discussed above. Once the Space is established, the Community Service application registry is copied to the Space 32 and all agents are notified of the new Space. When member 30, with a populated Space is joined, the copying of the registry allows the Community Service application 28 to receive the registry of the Space in member 30. This makes all of the members of the Space 30 members of the larger Community 10.

Figure 4:
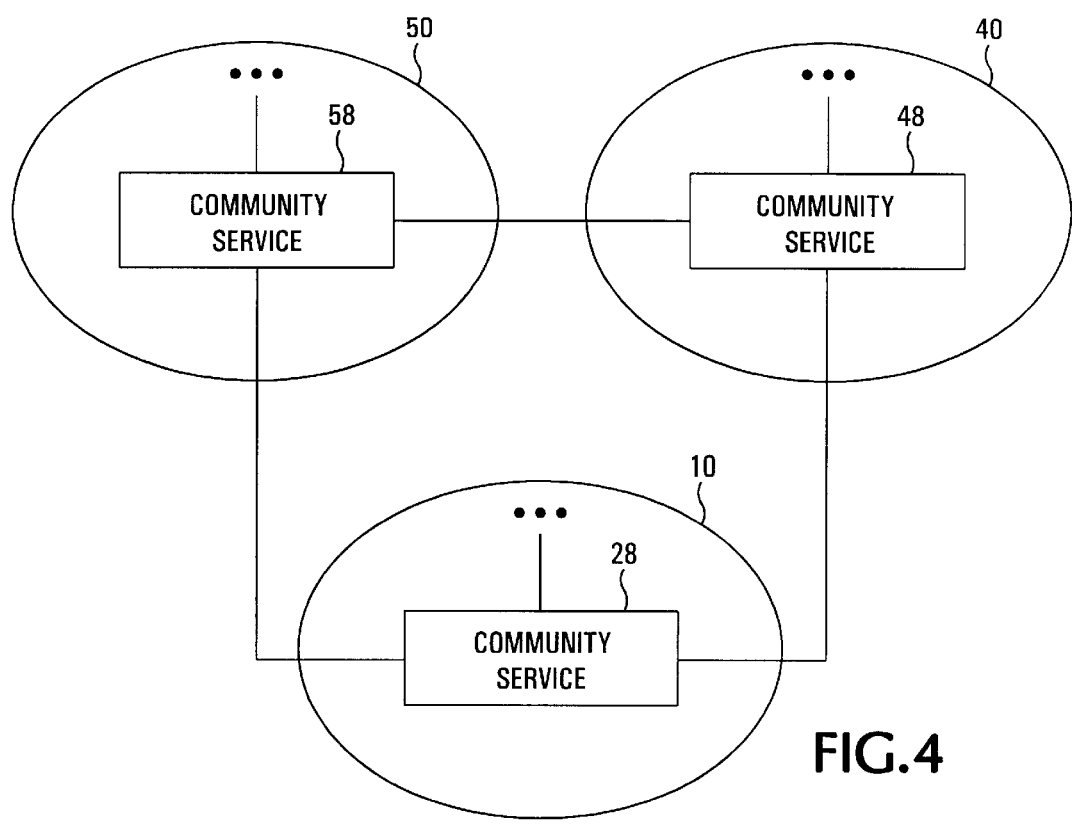
FIG. 4 shows a block diagram of one embodiment of several Communities interacting using their respective Community Service applications.

However, it is not necessary that the communication system be entirely comprises of one Community. As can be seen in FIG. 4, a communication system can be comprised of several Communities. This may be the case where a company has one communication system, but organizes the system around geographical plant sites or cities that form Communities.

The Community Service application has the ability to link these separate Communities together without losing their individual community properties. The Community Service application defines the relationships of the framework without requiring the parts to understand the whole.

Once multiple SI Spaces form a single Community as in FIG. 3, the requirement for Communities to form relationships to other Communities exists and is represented within the Community Service application application. This ties two Communities together in a peer-to-peer fashion. The Community Service application maintains these inter-community relationships. An example of a communication system formed from multiple Communities is shown in FIG. 4.

In FIG. 4, Community 10 has been joined by Communities 40 and 50, each with their own Community Service applications, 48 and 58 respectively. Communications traffic between these Communities is typically handled by a special agent, referred to as a Betweener agent. Betweener agents will request lookup registration entries pointing to other communities when they register with a Community. Once it has this pointer to a remote lookup service outside of this community, it will then contact the remote lookup service and ask for the CS within that community.

In this manner, the Community Service application only has to keep a forwarding pointer to the lookup service, not the all the other Community Service applications which would be difficult to maintain and may be harder to keep accurate. For example, Community Service application 28 only has to store information about the point to the lookup service piece of Community Service applications 48 and 58. As those other Services may be distributed over several network devices and are ever changing, there would be considerable traffic in trying to keep all the Community Service applications up to date with each other. With the pointer to the lookup service only, each Community Service application can access the necessary information directly.

By having the Betweener perform the location information, the Community Service application only needs to know other communities and other addresses of lookup services. The Betweener agent can either be a dedicated pathway between a single Community or be a pickup point for delivery to all other communities. It really only depends on whether or not it was pre-launched with these directives.

For example, assume that the Betweener is destined to pickup from a first Community 10 and will deliver only to a second Community 40. What the Betweener agent asks of the Community Service application 28 is the address of a Lookup service that belongs in the Community 40. Once it has this address is does a unicast discovery of services and matches against the Community Service application 48.

Once it has a Community Service application proxy from Community 40, it then goes ahead and requests all the spaces in the virtual Community. Given this information, it will then register for the events within the Community 40 when a space is removed from that virtual Community. In this manner, all communities are joined together by a series of Betweener agents.

Each individual Betweener is responsible for its discovery of remote communities and their validity. The Community Service application is only responsible for its local behavior and the location of remote lookup servers in different communities. This is generally called lookup and discovery tunneling. This could be handled within the lookup service itself, where another service published the existence of a lookup service in other lookup services in different communities. This pattern could also be followed and we would merely make a change as to where the Betweener looked for information.

Again, this does mean that the lookup services must be aware of remote lookup services or in the first case, that the local Community Service application must act as the agent to publish his existence with all lookup services and keep some persistent state information about other Community Service applications. If they are in other communities, then the Community Service application will hold a reference to the lookup server in the other Community, which will describe that Community. In this manner, there could be multiple Community Service applications in the remote Community, of which this Community Service application does not need to be aware. This Community Service application would simply need the references to the other lookup servers that contain the remote Community registration information.

Similarly, partitions can be removed and Communities can be joined as one Community, rather than maintaining separate identities. In order to do so, the Community Service applications for each Community must mutually load the other's registry. When one Community Service application is accessed, the other must also be accessed, to ensure replication between them. These then form a new Community Service application of the larger Community.

Thus, although there has been described to this point a particular embodiment for a method and apparatus for a fully distributed communication system, it is not intended that such specific references be considered as limitations upon the scope of this invention except in-so-far as set forth in the following claims.

What is claimed is:

1. A method for managing a scalable infrastructure communication system having at least one space with at least one lookup service, the method comprising:
   activating a self-healing Community Service application;
   using the self-healing Community Service application to manage the communication system, wherein managing includes the tasks of registering, adding cloning, restarting, creating and deleting entities, including agents, members, and spaces, within the communication system, as necessary, wherein a space is comprised of a distributed, persistent store;
   updating the self-healing Community Service application responsive to registrations, additions and deletions in the communication system; and
   repeatedly using and updating the self-healing Community Service application so long as the communication system is operable.

2. The method of claim 1 wherein activating the self-healing Community Service application further comprises executing a set of software instructions.

3. The method of claim 1 wherein updating the self-healing Community Service application further comprises inserting an object into the space.

4. A computer-readable medium, having included on it software code that, when executed by a computer, results in:
   activation of a self-healing Community Service application in a scalable infrastructure communication system having at least one space comprising a distributed, persistent store with at least one lookup service;
   management of the communication system wherein management includes the tasks of registering, creating cloning, restarting, adding and deleting entities, including members, agents and spaces, within the communication system, as necessary;
   updates to the self-healing Community Service application responsive to registrations, additions and deletions in the communication system; and
   repeatedly managing the communication system and updating the self-healing Community Service application so long as the communication system is operable.

5. The computer-readable medium of claim 4, wherein the software code that activates the self-healing Community Service application is Jini code.

6. The computer-readable medium of claim 4, wherein the software code that activates the self-healing Community Service application is Java code.

7. A network device comprising a memory, a network interface and a processor, wherein the processor is configured to perform the steps of:
   activating a self-healing Community Service application;
   using the Community Service application to manage a communication system, wherein managing includes the tasks of registering, creating cloning, restarting, adding and deleting entities, including members, agents and spaces, within the communication system, as necessary;
   updating the self-healing Community Service application responsive to registrations, additions and deletions in the communication system; and
   repeatedly using and updating the self-healing Community Service application so long as the communication system is operable.

8. A network device comprising:
   means for activating a self-healing Community Service application;
   means for using the self-healing Community Service application to manage a communication system, wherein managing includes the tasks of registering, creating, cloning, re-starting adding and deleting entities, including members, agents, and spaces, wherein a space is comprised of a distributed, persistent store, within the communication system, as necessary,
   means for updating the self-healing Community Service application responsive to registrations, additions and deletions in the communication system; and
   means for repeatedly using and updating the self-healing Community Service application so long as the communication system is operable.

* * * * *

UNITED STATES PATENT AND TRADEMARK OFFICE
CERTIFICATE OF CORRECTION

PATENT NO. : 6,775,833 B1
DATED : August 10, 2004
INVENTOR(S) : Gits et al.

It is certified that error appears in the above-identified patent and that said Letters Patent is hereby corrected as shown below:

Title page, Item [54], Column 1, line 1,
Title, reads "METHOD OF MANAGING A SCALABLE INTERFACE COMMUNICATION SYSTEM" should read -- METHOD OF MANAGING A SCALABLE INFRASTRUCTURE COMMUNICATION SYSTEM --.

Column 1,
Lines 8 and 9, insert:
-- Cross Reference to Related Applications
This application relates to the following U.S. patent applications, all commonly assigned to the assignee of this application. --.

Column 2,
Line 33, "the JavaSpaceS™ API." should read -- the JavaSpaces™ API. --.

Column 9,
Line 63, "cloning, restarting, creating" should read -- cloning, re-starting, creating --.

Column 10,
Line 41, "cloning, restarting, adding" should read -- cloning, re-starting, adding --.
Line 57, "cloning, re-starting adding" should read -- cloning, re-starting, adding --.
Line 58, "deleting entities, including" should read -- deleting entities including --.
Line 60, "as necessary, means" should read -- as necessary; means --.

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,775,833 B1 Page 1 of 1
APPLICATION NO. : 09/697821
DATED : August 10, 2004
INVENTOR(S) : Gits et al.

It is certified that error appears in the above-identified patent and that said Letters Patent is hereby corrected as shown below:

Title Page, References Cited, Item (56), U.S. Patent Documents, should include --6,463,446 B1--.

Signed and Sealed this

Seventh Day of November, 2006

JON W. DUDAS
*Director of the United States Patent and Trademark Office*